US005800711A

United States Patent [19]

Reeve et al.

[11] Patent Number: 5,800,711
[45] Date of Patent: Sep. 1, 1998

[54] PROCESS FOR THE FRACTIONATION OF POLYOXYALKYLENE BLOCK COPOLYMERS

[75] Inventors: Lorraine E. Reeve, Dexter; Michael G. Hinsberg, Sterling Heights, both of Mich.

[73] Assignee: MDV Technologies, Inc., San Diego, Calif.

[21] Appl. No.: 733,973

[22] Filed: Oct. 18, 1996

[51] Int. Cl.$^6$ .......................... B01D 11/04; C07C 37/72
[52] U.S. Cl. .......................... 210/639; 210/634; 568/621; 568/624
[58] Field of Search .......................... 568/621, 623, 568/624; 210/634, 639

[56] References Cited

U.S. PATENT DOCUMENTS

| | | | |
|---|---|---|---|
| 2,674,619 | 4/1954 | Lundsted | 260/485 |
| 2,677,700 | 4/1954 | Jackson et al. | 260/488 |
| 2,979,528 | 4/1961 | Lundsted | 260/584 |
| 2,980,737 | 4/1961 | Geyer et al. | 260/616 |
| 3,036,118 | 5/1962 | Jackson et al. | 260/484 |
| 3,478,109 | 11/1969 | McConnell | 260/611 |
| 3,492,358 | 1/1970 | Gurgiolo | 260/615 |
| 3,535,307 | 10/1970 | Moss et al. | 260/209 |
| 3,639,575 | 2/1972 | Schmolka | 424/78 |
| 3,740,421 | 6/1973 | Schmolka | 424/65 |
| 3,829,506 | 8/1974 | Schmolka | 260/615 B |
| 3,867,521 | 2/1975 | Miskel et al. | 424/37 |
| 3,867,533 | 2/1975 | Schmolka | 424/258 |
| 4,076,799 | 2/1978 | Willer et al. | 424/45 |
| 4,188,373 | 2/1980 | Krezanoski | 424/78 |
| 4,322,312 | 3/1982 | Boehmke | 568/621 |
| 4,439,196 | 3/1984 | Higuchi | 604/890 |
| 4,447,562 | 5/1984 | Ivani | 523/105 |
| 4,465,663 | 8/1984 | Schmolka | 424/62 |
| 4,762,951 | 8/1988 | Mueller | 568/617 |
| 4,859,802 | 8/1989 | Thomas | 568/621 |
| 4,962,238 | 10/1990 | Wolfe | 568/621 |

Primary Examiner—Ernest G. Therkorn
Attorney, Agent, or Firm—Cushman Darby & Cushman IP Group of Pollsbury Madison & Sutro LLP

[57] ABSTRACT

A process for the fractionation of polyoxyalkylene block copolymers wherein the polydispersity of the polyether is reduced. The fractionation process, which removes lower molecular weight species such as polyoxyalkylene homopolymer, truncated polyoxyalkylene diblock polymers, or other reaction byproducts, comprises salt extraction and liquid phase separation to provide a product with a narrower molecular weight distribution, lower degree of unsaturation, and distinctly different physical characteristics compared to the starting material.

32 Claims, 4 Drawing Sheets

PROCESS FOR THE FRACTIONATION OF POLYOXYALKYLENE BLOCK COPOLYMERS

BACKGROUND OF THE INVENTION

1. Field of the Invention

This present invention relates to a process for the fractionation of polyoxyalkylene block copolymers. More specifically, the present invention relates to a process for the fractionation of polyoxyalkylene block polyethers, such as the poloxamers, poloxamines, and polyoxypropylene/polyoxybutylene copolymers wherein the polydispersity of the polyether is reduced. The low polydispersity is achieved by the batchwise removal of low molecular weight species using a salt extraction and a liquid phase separation technique.

2. Description of the Prior Art

Block copolymers of propylene oxide (PO) and ethylene oxide (EO) are well known examples of aqueous surfactants. A number of triblock copolymers with the molecular forms both $E_x$-$P_y$-$E_x$ and $P_y$-$E_x$-$P_y$, where $E_x$ represents a block containing x oxyethylene units and $P_y$ represents a block containing y oxypropylene units, are commercially available. The properties of $E_x$-$P_y$-$E_x$ copolymers have been extensively studied. One class of the copolymers are known as poloxamers, according to the following formula:

It is α-Hydro-ω-hydroxypoly(oxyethylene)$_a$poly(oxypropylene)$_b$ poly(oxyethylene)$_a$ copolymer, in which a and b have values including, but not limited to, the following, as detailed in the National Formulary (NF):

| Polaxmer | a | b |
|---|---|---|
| 124 | 12 | 20 |
| 188 | 80 | 27 |
| 237 | 64 | 37 |
| 338 | 141 | 44 |
| 407 | 101 | 56 |

Synthetic block copolymers of ethylene oxide and propylene oxide are available in several types, conforming to the following requirements as listed in the National Formulary:

| Poloxamer | Physical Form | Average Molecular Weight | Weight % Oxyethylene | Unsaturation mEq/g |
|---|---|---|---|---|
| 124 | Liquid | 2090 to 2360 | 46.7 ± 1.9 | 0.020 ± 0.008 |
| 188 | Solid | 7680 to 9510 | 81.8 ± 1.9 | 0.026 ± 0.008 |
| 237 | Solid | 6840 to 8830 | 72.4 ± 1.9 | 0.034 ± 0.008 |
| 338 | Solid | 12700 to 17400 | 83.1 ± 1.7 | 0.031 ± 0.008 |
| 407 | Solid | 9840 to 14600 | 73.2 ± 1.7 | 0.048 ± 0.017 |

Commercially available poloxamers contain significant amounts of poly(oxyethylene) homopolymer and poly(oxyethylene)/poly(oxypropylene) diblock polymers due to the nature of the manner in which they are produced. The relative amounts of these byproducts increase as the molecular weights of the component blocks increase. For example, in poloxamer 407 they may constitute from about 15 to about 50% by weight of the polymer depending upon the manufacturer. There is a need to develop a method for removing a significant portion of the poly(oxyethylene) homopolymer and poly(oxypropylene)/poly(oxyethylene) diblock byproducts.

European Patent Application WO9216484 describes a method for removing the lower molecular weight components from poloxamer 188 by using gel permeation chromatography. The method of preparation comprises first condensing propylene oxide with a base compound containing a plurality of reactive hydrogen atoms to produce a poly(oxypropylene) polymer and then condensing the ethylene oxide with the poly(oxypropylene) polymer to produce a poly(oxypropylene)/poly(oxyethylene) block copolymer wherein the polydispersity value of the copolymer is less than 1.05 when the poly(oxypropylene) polymer is purified by gel permeation chromatography to remove any truncated polymers before condensation with the ethylene oxide. This method appears to be impractical for the preparation of large quantities of the fractionated poly(oxypropylene) polymer.

In Ding et al., the Eur. Polym. J., Vol. 27, No. 9, pp 901–905 (1991) there is described the use of a crown ether in the anionic polymerization of propylene oxide to produce diblock-copoly(oxypropylene/oxyethylene). Diblock-copoly(oxypropylene/oxyethylene) polymers with moderately long poly(oxypropylene) blocks (about 200 units) and narrow block-length distributions were prepared by use of 18-crown-6 ether and the potassium salt of methoxypropanol in the sequential anionic polymerization of bulk propylene oxide at room temperature and ethylene oxide at 40°–80° C.

U.S. Pat. No. 2,980,737 describes a process for obtaining pure polyalkylene glycols, polyalkylene glycol ethers, and the carboxylic esters thereof from mixtures of these compounds. A mixture of polyalkylene glycols and the monoethers thereof can be converted into the carboxylic esters thereof then separated into its individual components by fractional distillation. If desired, the original functionality can be restored by de-acylating the individual recovered acyl-compounds.

U.S. Pat. No. 3,478,109 discloses a method of removing a lower molecular weight fraction from a polymeric glycol having a number average molecular weight in the range of between about 1,500 and 12,000. The polymeric glycol is dissolved in cyclohexane and/or toluene and then extracted with methanol whereby the lower molecular weight species of the polymeric molecules are removed and the remaining polymeric glycol has an increased number average molecular weight.

U.S. Pat. No. 3,492,358 describes a process for purifying a crude poly(oxyethylene) glycol diether contaminated with the corresponding monoether by contacting the crude diether with an alkaline metal hydroxide and an inert water immiscible organic solvent to form an aqueous phase and a solvent phase and then separating the solvent phase and recovering the diether therefrom.

U.S. Pat. No. 4,762,951 discloses a process for narrowing the molecular weight distribution of poly(tetrahydrofuran) and the copolymers of tetrahydrofuran and alkylene oxides by using three solvents; an alcohol, a hydrocarbon and water, to achieve three phases. The three phases so formed are separated from one another and the polymer having the narrower molecular weight distribution is isolated from the two lower phases.

U.S. Pat. No. 4,962,238 discloses a method for removing glycols from a mixture of polyalkylene glycol dialkyl ethers by the use of a two solvent extraction system.

SUMMARY OF THE INVENTION

The present invention is an improved method for the fractionation of polyoxyalkylene block copolymers by the physical separation or fractionation of lower molecular weight byproducts (e.g. polyoxyalkylene homopolymer or truncated polyoxyalkylene diblock polymers) in the presence of the desired polyoxyalkylene block copolymer.

The present invention provides a process for the fractionation of polyoxyalkylene block copolymers comprising dissolving a known amount of the polyether in an extraction solvent, adding a soluble extraction salt to the solution, heating and equilibrating the resulting solution at an effective temperature and for an effective amount of time to allow distinct phases to appear in the solution, removing the lower phase, supplanting the volume of the lower phase by adding the extraction solvent to the remaining phase, repeating the extraction and heating and equilibrating steps as needed, and isolating and recovering a polymer having a narrower molecular weight distribution than the starting material.

It is an object of the present invention to provide a method which separates lower molecular weight byproducts from polyoxyalkylene block copolymers.

It is another object of the present invention to provide a method for narrowing the molecular weight distribution of polyoxyalkylene block copolymers and therefore the polydispersity.

It is yet another object of the present invention to exploit the differences in solubility between the desired polyoxyalkylene block copolymer and its lower molecular weight byproducts.

Yet another object of the present invention is to provide a method which produces a polyoxyalkylene block copolymer with improved physical and chemical characteristics including increased gel strength, decreased polydispersity, decreased unsaturation, decreased gelling concentration and an extended gel dissolution profile in comparison to commercially available poloxamers.

DESCRIPTION OF THE PREFERRED EMBODIMENTS

In order to evaluate the effect and advantages associated with the use of the present invention, certain terms which are typical molecular weight distribution parameters, are used herein. Thus, for purposes of describing the present invention, the following terms are used:

Number Average Molecular Weight ($M_n$)

$$M_n = \frac{\text{Sum of } (W_i) \text{ for all } i \text{ Values}}{\text{Sum of } (W_i/M_i)}$$

Weight Average Molecular Weight ($M_w$)

$$M_w = \frac{\text{Sum of } [(W_i)(M_i)] \text{ for all } i \text{ Values}}{\text{Sum of } (W_i) \text{ for all } i \text{ Values}}$$

Polydispersity Index ($D$)

$$(D) = \frac{Mw}{Mn}$$

where:
$W_i$ is the mass of the i-th polymer species/oligomer and $M_i$ is the molecular weight of the i-th polymer species/oligomer.

Dispersity or polydispersity, used herein interchangeably, is a universally accepted measure of molecular weight distribution. The lower the dispersity value, the narrower is the molecular weight distribution for the sample under consideration. Some processing and end use characteristics, such as melt flow, flex life, tensile strength, etc. are often best predicted or understood by observing the values and/or changes occurring in specific molecular weight averages.

A wide variety of procedures is available for determining molecular weight including gel permeation chromatography or other chromatographic techniques, viscosity related measurements, light scattering, osmotic pressure, ultra centrifugation and chemical methods involving end group analysis or the like. Molecular weight distribution parameters (i.e. Mw, Mn, and D) are most conveniently measured using gel permeation chromatography as described in ASTM method D5296 and applicable references cited therein.

Although molecular weight averages are important and useful when contrasting polymers in general, it is also important to know the molecular weight distribution. The breadth of the distribution, known as the polydispersity (D), is defined as the ratio Mw/Mn as shown above. In a monodisperse population where all molecules are identical, Mw=Mn and the polydispersity is equal to 1. As the molecular weights of the individual molecules within the population become more varied, Mw and Mn diverge and the polydispersity value increases. Polymer molecular weight standards typically have polydispersity values between 1.0 and 1.1. Typical polymers have values in the range of 2 to 5 and some may have polydispersities in excess of 20. A high polydispersity value indicates a wide variation in size within the population of molecules in a given preparation while a lower polydispersity value indicates less variation.

The process of the present invention accomplishes the separation of lower molecular weight byproducts from high molecular weight polyoxyalkylene block copolymers. With no intention of limiting the invention, poloxamers, which are α-hydro-ω-hydroxypoly(oxyethylene)$_a$ poly(oxypropylene)$_b$poly(oxyethylene)$_a$ block copolymers are used herein to describe the process of the present invention. The average molecular weight of poloxamers may range from about 1,000 to greater than 16,000 daltons. Because poloxamers are products of a sequential series of reactions, the molecular weights of the individual poloxamer molecules form a statistical distribution about the average molecular weight.

Commercially available poloxamers contain substantial amounts of poly(oxyethylene) homopolymer and poly(oxyethylene)/poly(oxypropylene) diblock polymers. The relative amount of these byproducts increase as the molecular weights of the component blocks of the poloxamer increase. Depending upon the manufacturer, these byproducts may constitute from about 15 to about 50% of the total mass of the polymer in the highest molecular weight version (i.e. poloxamer 407). For example, approximately 44% of the total mass of the polymer from one supplier consisted of these low molecular weight byproducts while they constituted only about 14% of the mass in another manufacturer's equivalent product.

The present invention exploits the differences in solubility among the poloxamer molecules, the poly(oxyethylene) homopolymer, and the poly(oxyethylene)/poly(oxypropylene) diblock byproducts in order to remove substantial amounts of these byproducts from the poloxamer. The process of the present invention removes the most polar fraction of the polymer, which generally includes the lower molecular weight fraction. The poloxamer having the larger molecular weight and being less polar, is recovered in the process. The larger molecular weight poloxamer recovered by this method exhibits physical characteristics substantially different from the starting material or commercially available poloxamer.

The major variables within the process of the present invention are interrelated. The polymer, water/organic extraction solvent, soluble salt, and extraction temperature with their respective concentrations or values must be coordinated. Changes to one of the variables will generally necessitate changes in one or more of the other variables to achieve the desired fractionation and phase separation.

By the term polymer is meant any polyoxyalkylene block copolymer with a number average molecular weight between about 1,000 and about 16,000 daltons that is soluble in the chosen water/solvent/salt extraction system. Preferably, the polymer may be a polyoxyalkylene block copolymer having a number average molecular weight between about 4,000 and about 15,000 daltons, containing between about 40 and 90% oxyethylene by weight. The polymer may be any polyoxyalkylene block copolymer and should not be limited to the poloxamers. However, poloxamers are preferred because of their commercial uses. The polyoxyalkylene block copolymers are typically derived by conventional methods well known to those skilled in the art using starting materials such as, but not limited to, ethylene oxide, propylene oxide, butylene oxide or tetrahydrofuran. Polymer concentrations up to 10% by weight relative to the water/organic/salt system may be utilized. A preferred concentration of polymer is less than about 3% by weight.

By the term water/organic extraction solvent in the following description is meant any solvent that remains miscible in the water/organic/salt system of the present invention. N-propanol is the preferred organic solvent. Upon modification of the organic solvent concentration, or salt concentration and extraction temperature, other miscible organic solvents could be used in the process. For example, methanol, ethanol, isopropanol, acetone, acetic acid, and dimethyl sulfoxide are suitable for inclusion in the process of the present invention. The organic solvent should be added to water so that the resulting extraction solvent may contain from about 5 to about 95% of the water miscible organic solvent.

Many soluble organic salts may be used in the present invention as effective phase separating agents. Sodium chloride is the preferred salt, however, any halide, acetate, hydroxide, carbonate, sulfate, or phosphate salt of the alkali or alkaline-earth metals from groups IA and IIA of the periodic table will function in the process of the present invention provided that the salt is soluble in the water/organic extraction solvent chosen. The concentration of soluble salt in the solution may be an amount effective to cause phase separation. Preferably, the amount may range from about 1 to about 13% by weight.

The proper extraction temperature should be chosen so that there is about a 3° to 25° C. difference between the cloud point of the preferred polyoxyalkylene block copolymer and that of its homopolymer byproduct in the chosen extraction solvent/salt system. Many polyethers, including the poloxamers, display solubility behavior in aqueous solutions that is the reverse of what is normally expected, that is, they become less soluble in the solution as the temperature is increased. The cloud point is defined as the temperature at which a polymer, at a specific concentration in a specific solvent mixture, becomes insoluble and precipitates, causing the solution to become hazy or cloudy. The preferred extraction temperature should be low enough to permit easy handling of the equilibrated extracts but high enough to allow for precise temperature control. The proper solvent, salt and temperature combination is determined by dissolving the polyoxyalkylene block copolymer in a number of different water/organic solvent concentrations, e.g., 20, 40, 60, and 80% organic solvent in water. The solutions are then equilibrated to about 3° to 5° C. below the desired extraction temperature. The soluble salt may then be added slowly to each solution with vigorous mixing until one of the solutions turns opaque. The water, solvent, salt and temperature combination are varied depending on the block copolymer that is to undergo phase separation and subsequent fractionation. Typically, the extraction temperature may vary from about 5° to about 95° C. depending upon the water/organic solvent/salt combination employed in the process. The preferred extraction temperature is between about 15° and 50° C. The time period for the extraction is dependent also on the water/organic solvent/salt combination used in the process. The timing should be sufficient to provide an effective phase separation and extraction. Typically, the time period for the extraction may be up to about 16 hours and preferably about 3 to about 4 hours. With the foregoing in mind, a general description of the process for the present invention follows:

1. A specific amount of the polyoxyalkylene block copolymer to be purified or fractionated is dissolved in a mixed water/organic extraction solvent.

2. The mixture is equilibrated to about 3° to 5° C. below the proper extraction temperature as determined by the aforementioned procedure, then a soluble salt is added slowly with vigorous mixing until the solution becomes opaque.

3. The solution is then allowed to equilibrate at the extraction temperature until two distinct phases, upper and lower, appear (usually about 2 to about 8 hours).

4. The lower layer is removed. The upper layer is returned to its original volume by the addition of more water/organic extraction solvent.

5. Steps 2, 3, and 4 are repeated anywhere from about two to about ten times depending upon the polyoxyalkylene block copolymer used as the starting material and the required degree of fractionation.

6. After the final extraction, the upper layer containing the fractionate of the polyoxyalkylene may be isolated and/or concentrated by extraction into chloroform or other suitable solvent, dialysis, or other appropriate technique. If organic extraction is used, the organic solvent may be dried by filtering through a suitable filtering medium such as anhydrous sodium sulfate.

7. Residual solvent(s) can be removed, for example under vacuum or by lyophilization.

8. The fractionate of the polyoxyalkylene block copolymer is the dried residue obtained after removal of the solvent.

The fractionate has a reduced polydispersity. The narrower molecular weight distribution allows for better functionality of the polyoxyalkylene block copolymer whether it is a surfactant, pharmaceutical carrier or whether it exhibits biological activity.

The following examples illustrate the fractionation of low molecular weight mono- and diblock polymers from water soluble polyoxyalkylene block copolymers yielding a polyether with reduced polydispersity.

EXAMPLE 1

Poloxamer 407, manufactured by BASF, Parsippany, N.J. (lot number WPDP-586B), in the amount of 12 grams, was dissolved in 400 mL of a water/organic extraction solvent, a mixture of water and n-propanol in a 75/25 parts v/v solution. Sodium chloride, in the amount of 32 grams, was added to this solution. The solution was mixed until all the salt dissolved and then placed in a cabinet maintained at 30° C. until two clear, colorless phases were formed. This took approximately 16 hours. The lower phase (approximately 330 mL) was removed and the solution returned to its original volume by the addition of the same amount of water/n-propanol 75/25 solution. The resulting solution was mixed thoroughly. The salt content was then adjusted to near its original concentration by adding an amount equal to 80 mg sodium chloride per mL of the water/organic extraction solvent added to the solution to regain its original volume. The solution was then mixed until all the salt was dissolved and returned to the cabinet and maintained at 30° C. until two, clear, colorless phases formed. The step of draining the lower phase, replacing it with the water/organic solvent solution and the addition of salt was repeated seven additional times.

The lower phase was drained from the eighth extraction and the upper phase was extracted with approximately 50 mL of chloroform. The chloroform solvent was removed under a vacuum at 70° C. and the resultant molten poloxamer cooled to 4° C. to induce solidification. The solid poloxamer was analyzed for weight percent oxyethylene by nuclear magnetic resonance using the NF 17 procedure. The molecular weight profile was obtained by GPC as described earlier. The viscosity of the poloxamer in solution was obtained using a cone/plate viscometer as described previously. Table 1 compares the results of the analysis of the fractionated poloxamer to that of the initial, unfractionated material.

EXAMPLE 2

Poloxamer 407, manufactured by BASF (lot number WPDP-586B), in an amount of 48 grams, was dissolved in 1600 mL of 75/25 water/n-propanol v/v solution. Sodium chloride, in the amount of 120 g, was added to the solution. The solution was mixed until the all the salt was dissolved, and then placed in a cabinet maintained at 30° C. until two clear, colorless phases formed (about 16 hours). The lower phase (approximately 1300 mL) was removed and the solution returned to near its original volume by the addition of the same amount of the water/n-propanol 75/25 solvent. The resulting solution was mixed thoroughly and then the sodium chloride content was determined using a Quantab® chloride titrator, supplied by Environmental Test Systems, Elkhart, Ind. The sodium chloride content in the solution was adjusted to 7.0% by weight. The solution was then mixed until all the added salt was dissolved and returned to the cabinet for storage at 30° C. until two clear, colorless phases formed. This step was repeated a second time.

The lower phase was removed from the third extraction and the upper phase was extracted with approximately 100 mL of chloroform. The chloroform layer was filtered through anhydrous sodium sulfate and then evaporated under vacuum at 80° C. The resulting molten polymer was cooled to 4° C. to induce solidification.

The resulting poloxamer was analyzed for weight percent oxyethylene, molecular weight profile, and viscosity as described in Example 1. Results are presented in Table 1.

Table 1 indicates that there is a dramatic increase in the viscosity of the 28% w/w solution of the poloxamer 407 fractionated in the processes shown in Examples 1 and 2, compared to the unfractionated material. Likewise, there is a reduction in the polydispersity.

Figure 1:
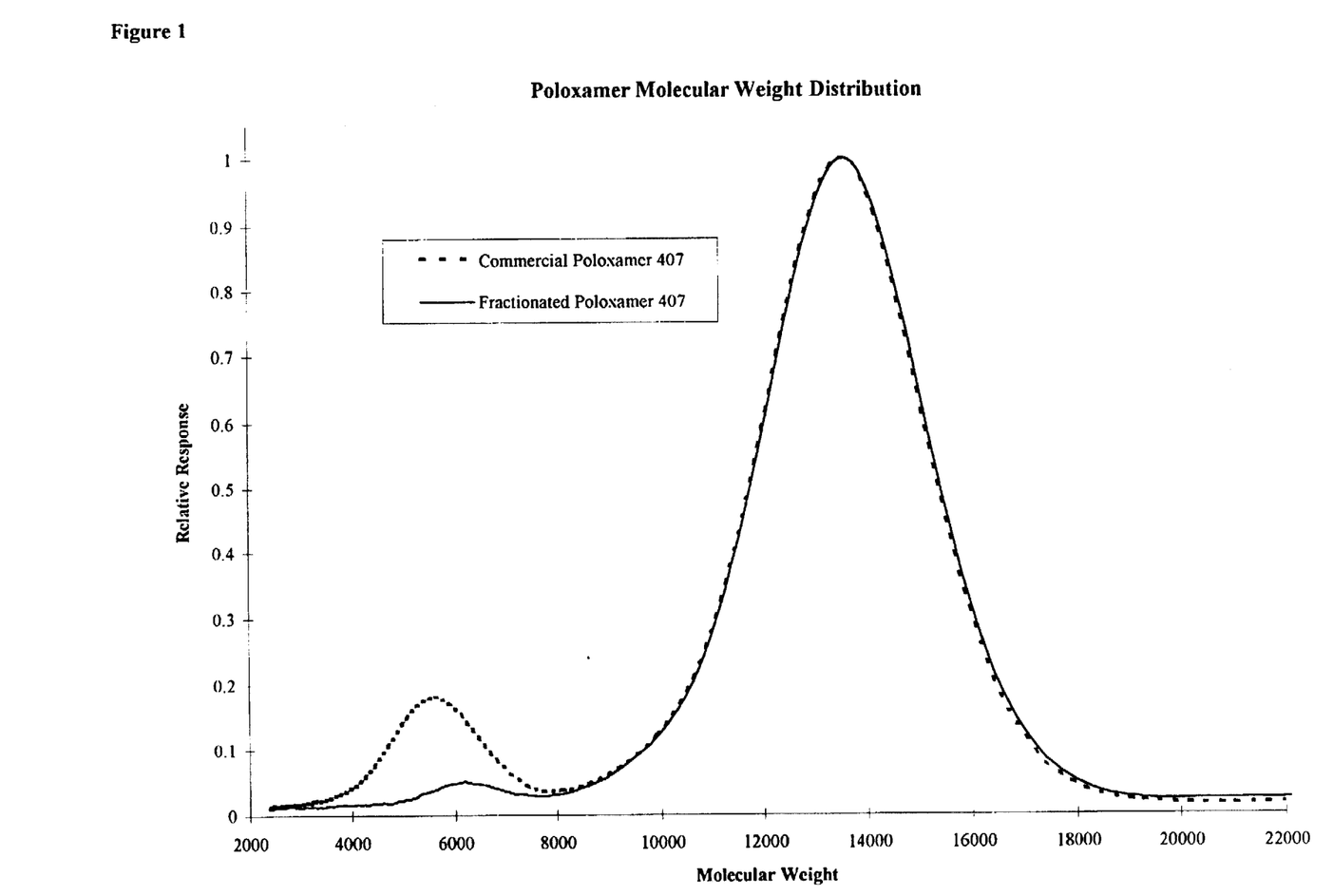
FIG. 1 provides a graphical comparison of the molecular weight distributions of commercial poloxamer 407 (broken line) and fractionated poloxamer 407 (solid line) of the present invention. The molecular weight profiles were obtained by Gel Permeation Chromatography (GPC) using two 7.8 mm×25 cm columns packed with a styrene/divinyl benzene copolymer gel ($10^3$ Å pore size), refractive index detection, and tetrahydrofuran/triethylamine 98:2 v/v as the elution solvent.
Figure 2:
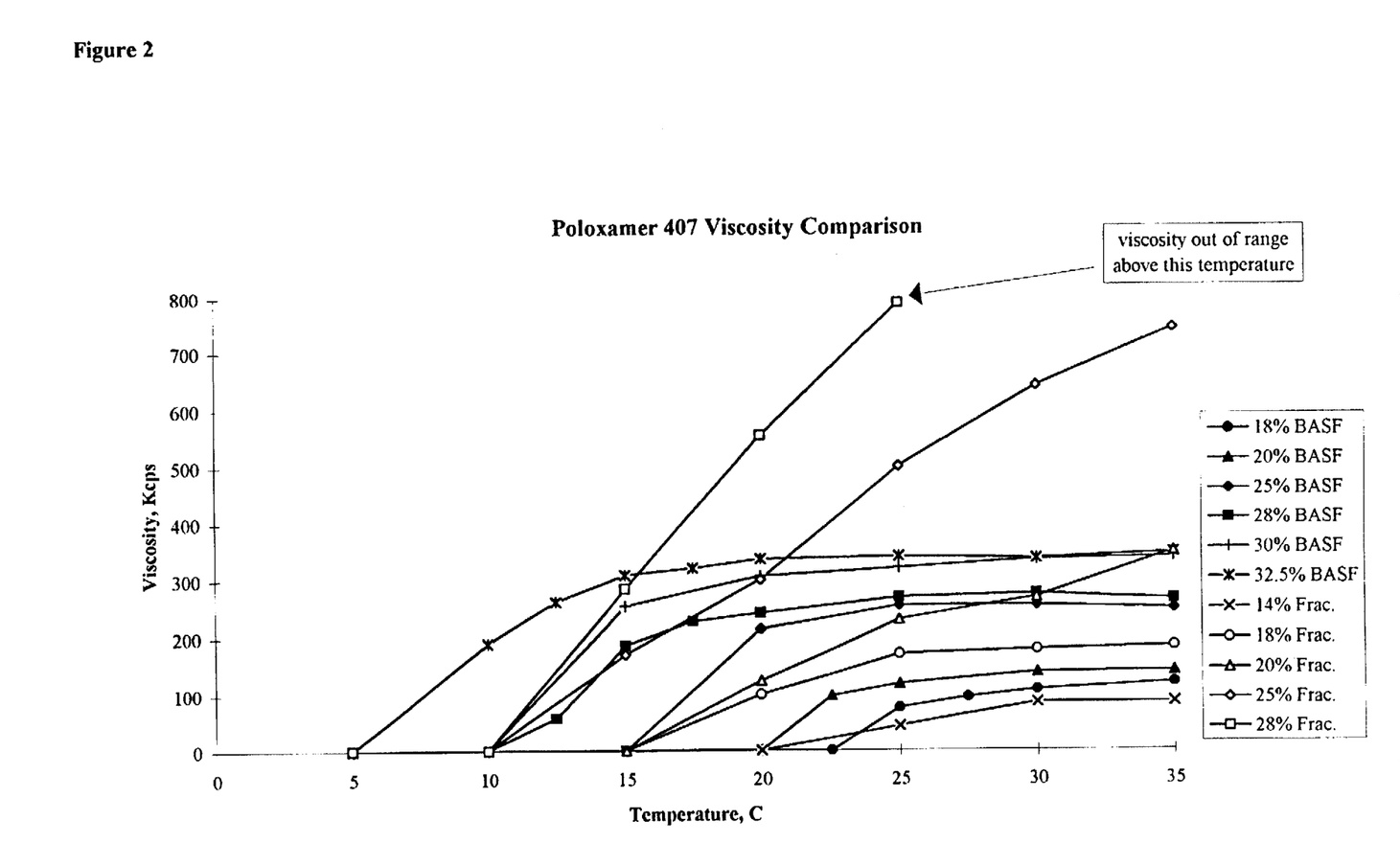
FIG. 2 provides a graphical comparison of the viscosity profiles of various concentrations of commercial poloxamer 407 and fractionated poloxamer 407 of the present invention. The concentrations for the samples range from 14 to 32.5% w/w. The viscosity profiles were measured with a Wells-Brookfield cone/plate viscometer using a CP-51 cone and a rotational speed of 0.5 rpm. The sample cup temperature was controlled with a PolyScience refrigerator/circulator using a 50/50 v/v mixture of propylene glycol and water as the temperature regulating fluid.

A comparison of the molecular weight distribution of commercial and fractionated poloxamer 407 is shown in FIG. 1. A chart comparing the viscosity profiles of various concentrations of commercial and fractionated poloxamer 407 is shown in FIG. 2.

TABLE 1

Poloxamer Properties Comparison - Examples 1 and 2

| Sample | Wt % Oxyethylene | Mw | Mn | Mw/Mn | Viscosity, cps* |
|---|---|---|---|---|---|
| BASF (WPDP-586B) | 74.3 | 11,973 | 10,152 | 1.179 | 274,000 |
| MDV (Example 1) | 69.9 | 13,072 | 11,904 | 1.098 | >820,000† |
| MDV (Example 2) | 69.6 | 12,778 | 11,442 | 1.117 | >820,000 |

*28% solution @ 30° C.
† 820,00 cps is the highest measurable viscosity under the test conditions used.

EXAMPLE 3

Poloxamer 188, obtained from BASF (lot number WPMO-568B), in an amount of 30 grams, was dissolved in 900 grams of 75/25 v/v, water/n-propanol. The solution was equilibrated to 37° C. and then sodium chloride in the amount of 78.3 grams was added slowly with vigorous mixing until the solution became opaque. The solution was then placed in a cabinet maintained at 30° C. until two clear, colorless phases were formed. The lower phase was removed and 712 grams of 75/25 water/n-propanol were added to the upper phase and mixed. The solution was equilibrated to 27° C. Sodium chloride was then added slowly with vigorous mixing until the solution became opaque. The total amount of sodium chloride added was 55.9 grams. The solution was then placed in a cabinet maintained at 30° C. until two clear, colorless phases formed. The lower phase was drained a second time and then 665 grams of 75/25 water/n-propanol were added to the upper phase and mixed. The solution was equilibrated to 27° C. and then sodium chloride was added slowly with vigorous mixing until the solution became opaque. The total amount of sodium chloride added was 53.1 grams. The solution was placed in a cabinet maintained at 30° C. until two clear, colorless phases formed. The lower phase was removed from the third extraction and the upper phase was extracted with approximately 200 mL of chloroform. The chloroform layer was filtered through anhydrous sodium sulfate and then evaporated under vacuum at 80° C. The resulting molten poloxamer was cooled to 4° C. to induce solidification, and then crushed and dried overnight at 50° C. The resulting polymer was analyzed for weight percent oxyethylene, molecular weight profile, and viscosity using the methods described in Example 1. Comparative results are presented in Table 2.

Figure 3:
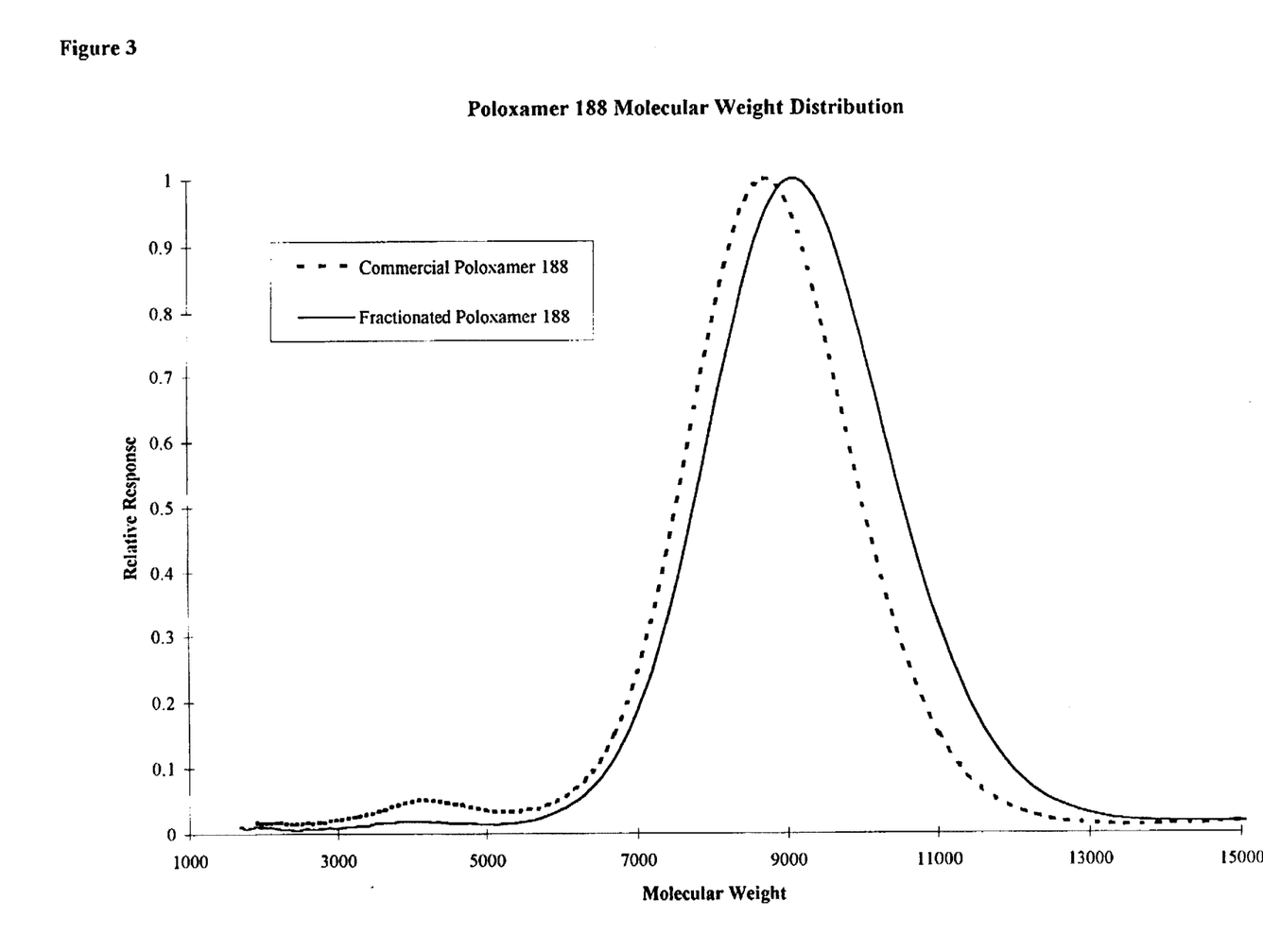
FIGS. 3 and 4 show results of comparisons as described in FIGS. 1 and 2 for commercial poloxamer 188 and fractionated poloxamer 188 of the present invention.
Figure 4:
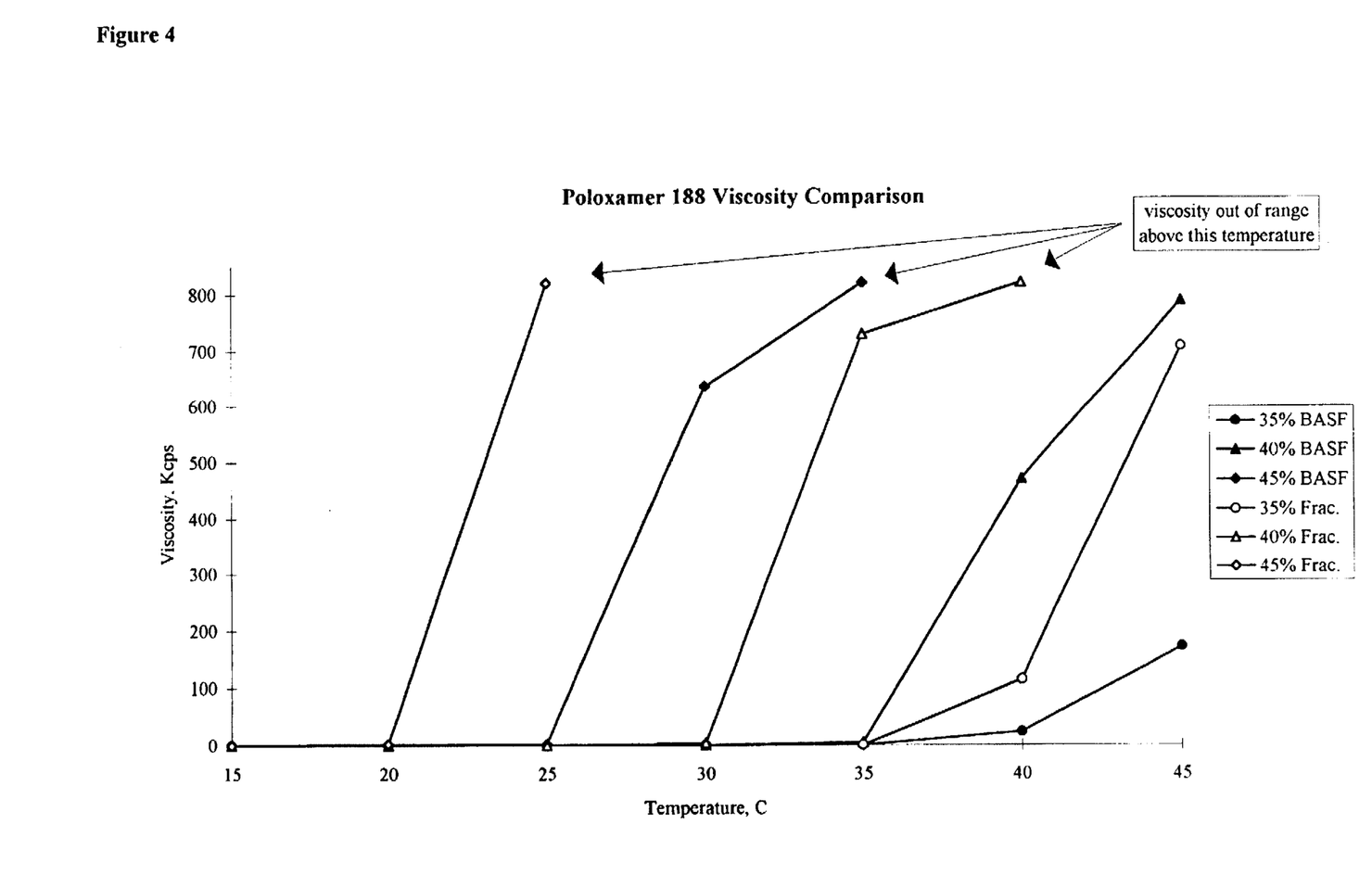

A comparison of the molecular weight distributions of commercial and fractionated poloxamer 188 is shown in FIG. 3. A chart comparing the viscosity profiles of various concentrations of commercial and fractionated poloxamer 188 is shown in FIG. 4.

TABLE 2

Poloxamer Properties Comparison - Example 3

| Sample | Wt % Oxyethylene | Mw | Mn | Mw/Mn | Viscosity, cps* |
|---|---|---|---|---|---|
| BASF (WPMO-568B) | 80.8 | 8,540 | 8,118 | 1.052 | 4,900 |
| MDV (Example 3) | 79.9 | 9,102 | 8,678 | 1.049 | 730,000 |

*40% solution @ 35° C.

EXAMPLE 4

A pilot scale batch of fractionated poloxamer 407 was prepared by dissolving 0.52 Kg of commercially available poloxamer 407, obtained from BASF (lot number WPDP-586B), and 16.7 Kg of 75/25 water/n-propanol v/v. The solution was equilibrated to 27° C. Sodium chloride was added slowly with vigorous mixing until the solution became opaque. The total sodium chloride added was 1.3 Kg. The solution was placed in a cabinet maintained at 30° C. until two clear, colorless phases formed. The lower phase was drained, then 15.3 Kg of 75/25 water/n-propanol were added to the upper phase and mixed. The solution was equilibrated to 27° C. and sodium chloride was added slowly with vigorous mixing until the solution became opaque. The total sodium chloride added was 1.2 Kg. The solution was placed in a cabinet maintained at 30° C. until two clear, colorless phases formed.

The lower phase was drained a second time, then 12.5 Kg of 75/25 water/n-propanol were added to the upper phase and mixed. The solution was equilibrated to 27° C. then sodium chloride was added slowly with vigorous mixing until the solution became opaque. Total sodium chloride added was 1.0 Kg. The solution was then placed in a cabinet maintained at 30° C. until two clear, colorless phases formed.

The lower phase was drained from the third extraction and the upper phase was extracted with approximately 4 L of chloroform. The chloroform layer was filtered through anhydrous sodium sulfate, then the solvent removed under vacuum at 80° C. The resulting molten poloxamer was cooled to 4° C. to induce solidification then crushed and dried overnight at 50° C. The dried poloxamer extract was analyzed for unsaturation by oxymercuration using the NF 17 procedure as well as molecular weight profile and viscosity using the methods described in Example 1. Comparative results are presented in Table 3.

EXAMPLE 5

Poloxamer 407 (BASF Corporation, lot WPDP-586B) in an amount of 10 grams, was dissolved in 920 g of 75/25 water/n-propanol v/v solution. The solution was equilibrated to 27° C. then 70.0 g of sodium chloride was added with vigorous mixing. The solution was placed in a 30° C. cabinet for 16 hours to allow two clear, colorless phases to form. The lower phase was drained and the solution was returned to near its initial weight by the addition of 835.7 g of water/n-propanol 75/25 v/v solution (followed by equilibration to 27° C.) and 63.7 g of sodium chloride (with vigorous mixing). The solution was returned to a 30° C. cabinet for an additional 16 hours to allow two clear, colorless phases to form. The lower phase was drained a second time and the solution returned to near its original weight by the addition of 824.4 g water/n-propanol solution and 61.7 g of sodium chloride as described earlier. The resulting solution was returned to the 30° C. cabinet for an additional 16 hours then the lower phase was drained and discarded. The upper phase from the third extraction was extracted with approximately 50 mL of chloroform. The chloroform layer was filtered through anhydrous sodium sulfate then evaporated under vacuum at 80° C. The resulting poloxamer was cooled to 4° C. to induce solidification then crushed and dried to constant weight at 50° C. The mass of the recovered poloxamer was 5.3

The resulting poloxamer was analyzed for weight percent oxyethylene and unsaturation by the NF 17 procedures and molecular weight profile and viscosity as described earlier. Comparative results are presented in Table 3.

TABLE 3

Poloxamer Properties Comparison - Examples 4 and 5

| Sample | Wt % Oxyethylene | Unsat'n, mEq/g | Mw | Mn | Mw/Mn | Viscosity, cps* |
|---|---|---|---|---|---|---|
| BASF (WPDP-586B) | 74.3 | 0.058 | 11,973 | 10,152 | 1.179 | 248,000 |
| MDV (Example 4) | — | 0.006 | 12,806 | 11,732 | 1.092 | 594,000 |
| MDV (Example 5) | 66.9 | 0.008 | 13,294 | 12,490 | 1.064 | >820,000† |

*25% solution @ 30° C.
† 820,000 cps is the highest measurable viscosity under the test conditions used.

This invention has been described with reference to certain specific embodiments, disclosed herein for the purpose of illustration. However, it will be recognized by those skilled in the art that many variations are possible without departing from the scope and spirit of the invention.

We claim:

1. A process for the fractionation of polyoxyalkylene block copolymers comprising:
   a) dissolving a known amount of the copolymer in an extraction solvent to form a solution,
   b) equilibrating the solution at an effective temperature to allow the formation of an opaque solution when an extraction salt is added to the solution, c) adding a soluble extraction salt to the solution, d) heating and equilibrating the resulting solution at an effective temperature and for an effective amount of time to allow an upper phase and lower phase to appear in the solution, e) removing the lower phase, f) supplanting the volume of the lower phase by adding the extraction solvent to the remaining phase, g) repeating steps b through f an effective number of times to yield the desired fractionation, h) isolating the fractionated upper phase upon the final extraction in step g, and i) removing any remaining solvent from step h to to yield the fractionated polyether.

2. The process of claim 1 wherein the polyoxyalkylene block copolymer has a molecular weight from about 1,000 to about 16,000 daltons.

3. The process of claim 2 wherein the polyoxyalkylene block copolymer contains about 40 to about 90% oxyethylene by weight.

4. The process of claim 1 wherein the extraction solvent contains about 5 to about 95% of a water miscible organic solvent.

5. The process of claim 4 wherein the extraction solvent contains about 95 to about 5% water.

6. The process of claim 4 wherein the water miscible organic solvent is selected from the group consisting of n-propanol, methanol, ethanol, isopropanol, acetone, acetic acid and dimethyl sulfoxide.

7. The process of claim 1 wherein the extraction salt is a soluble salt selected from the group consisting of halide, acetate, hydroxide, carbonate, sulfate, and phosphate salts of alkali and alkaline earth metals of groups IA and IIA of the periodic table.

8. The process of claim 7 wherein the extraction salt is sodium chloride.

9. The process of claim 8 wherein the concentration of the salt in the solution is an amount effective to cause the formation of two distinct phases at an effective temperature and period of time.

10. The process of claim 9 wherein the concentration of salt in the solution is about 1 to about 13% by weight of the solution.

11. The process of claim 1 wherein the effective extraction temperature ranges from about 5° to about 95° C.

12. The process of claim 11 wherein the effective extraction temperature ranges from about 15° to about 50° C.

13. The process of claim 1 wherein the amount of the polyoxyalkylene block copolymer in the extraction solvent may be up to about 10% by weight of the solution resulting from the addition of the extraction salt to the extraction solvent containing the polyether of step (c).

14. The process of claim 13 wherein the amount of the polyoxyalkylene block copolymer may be up to about 3% by weight of the solution resulting from the addition of the extraction salt to the extraction solvent containing the polyoxyalkylene block copolymer of step (c).

15. The process of claim 1 wherein the polydispersity of the polyoxyalkylene polyether is reduced.

16. A process for the purification of a poloxamer comprising:

a) dissolving a known amount of the poloxamer in an extraction solvent to form a solution, b) equilibrating the solution at an effective temperature to allow the formation of an opaque solution when an extraction salt is added to the mixture, c) adding a soluble extraction salt to the solution, d) heating and equilibrating the resulting solution at an effective temperature and for an effective amount of time to allow two distinct phases to appear in the solution, e) removing the lower phase, f) supplanting the volume of the lower phase by adding the extraction solvent to the remaining phase, g) repeating steps b through f an effective number of times to yield the desired fractionation, h) isolating the fractionated upper phase upon the final extraction in step g, and i) removing any remaining solvent from step h to yield the purified poloxamer.

17. The process of claim 16 wherein the poloxamer has a molecular weight from about 1,000 to about 16,000 daltons.

18. The process of claim 17 wherein the poloxamer contains about 40 to about 90% oxyethylene by weight.

19. The process of claim 16 wherein the extraction solvent contains about 5 to about 95% of a water miscible organic solvent.

20. The process of claim 19 wherein the water miscible organic solvent contains about 95 to about 5% water.

21. The process of claim 19 wherein the water miscible organic solvent is selected from the group consisting of n-propanol, methanol, ethanol, isopropanol, acetone, acetic acid and dimethyl sulfoxide.

22. The process of claim 16 wherein the extraction salt is a soluble salt selected from the group consisting of halide, acetate, hydroxide, carbonate, sulfate, and phosphate salts of alkali and alkaline earth metals of groups IA and IIA of the periodic table.

23. The process of claim 22 wherein the extraction salt is sodium chloride.

24. The process of claim 23 wherein the concentration of the salt in the solution is an amount effective to cause the formation of two distinct phases at an effective temperature and period of time.

25. The process of claim 24 wherein the concentration of salt in the solution is about 1 to about 13% by weight of the solution.

26. The process of claim 16 wherein the effective extraction temperature ranges from about 5 to about 95° C.

27. The process of claim 26 wherein the effective extraction temperature ranges from about 15° to about 50° C.

28. The process of claim 16 wherein the amount of the poloxamer in the extraction solvent may be up to about 10% by weight of the solution resulting from the addition of the extraction salt to the extraction solvent containing the poloxamer of step (c).

29. The process of claim 28 wherein the amount of the poloxamer may be up to about 3% by weight of the solution resulting from the addition of the extraction salt to the extraction solvent containing the poloxamer of step (c).

30. The process of claim 16 wherein the polydispersity of the polyoxyalkylene polyether is reduced.

31. The process of claim 16 wherein the poloxamer is poloxamer 188.

32. The process of claim 16 wherein the poloxamer is poloxamer 407.

* * * * *